US008484160B2

(12) United States Patent
Kumar et al.

(10) Patent No.: US 8,484,160 B2
(45) Date of Patent: Jul. 9, 2013

(54) SELECTIVE VIRTUAL MACHINE IMAGE REPLICATION SYSTEMS AND METHODS

(75) Inventors: Sanjay Kumar, Maharashtra (IN); Mukund Agrawal, Maharashtra (IN); Niranjan Pendharkar, Maharashtra (IN); Sumit Kumar, Maharashtra (IN); Subash Rajaa, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 205 days.

(21) Appl. No.: 12/887,360

(22) Filed: Sep. 21, 2010

(65) Prior Publication Data

US 2012/0072393 A1    Mar. 22, 2012

(51) Int. Cl.
*G06F 7/00*    (2006.01)
*G06F 17/00*    (2006.01)

(52) U.S. Cl.
USPC ........... 707/634; 707/610; 707/615; 707/616; 707/626

(58) Field of Classification Search
USPC .......................... 707/610, 615, 616, 626, 634
See application file for complete search history.

(56) References Cited

U.S. PATENT DOCUMENTS

| 6,845,464 | B2 * | 1/2005 | Gold ............................. 714/6.11 |
| 7,966,290 | B2 * | 6/2011 | Gupta et al. ................. 707/640 |
| 8,099,605 | B1 * | 1/2012 | Billsrom et al. .............. 713/187 |
| 2003/0101167 | A1 * | 5/2003 | Berstis ............................. 707/3 |
| 2005/0071390 | A1 * | 3/2005 | Midgley et al. ............... 707/204 |
| 2009/0222498 | A1 * | 9/2009 | Lu et al. ........................ 707/204 |
| 2010/0030983 | A1 * | 2/2010 | Gupta et al. .................. 711/162 |
| 2010/0217837 | A1 * | 8/2010 | Ansari et al. .................. 709/218 |

* cited by examiner

*Primary Examiner* — Phong Nguyen
(74) *Attorney, Agent, or Firm* — Wilmer Cutler Pickering Hale and Dorr LLP

(57) ABSTRACT

Systems and methods for fault handling are presented. In one embodiment, a fault handling method includes: performing an information collection process, wherein the information collection process includes collecting information regarding guest operating system files of a virtual machine; performing a selective replication region identification process, wherein the selective replication region identification process includes identifying regions associated with a selective amount of the guest operating system files; and performing a replication process based upon result of the replication region identification process. In one embodiment, the selective replication region identification process includes identifying regions associated with files of interest. The selective replication region identification process can include identifying regions associated with temporary files. The information regarding files can include a list of regions used by the files after loopback mounting of a virtual disk file, a list of regions which have been modified on the virtual disk file and regions associated with metadata that has changed.

17 Claims, 10 Drawing Sheets

200

---

210
Engaging in virtual machine environment operations.

220
Performing an intelligent selective file replication process.

230
Performing a virtual machine re-creation.

310
Performing an information collection process.

---

320
Performing a selective replication region identification process.

---

330
Performing a replication process.

410
Regions in common to both a list of regions used by the files after loopback mounting of a virtual disk file and a list of regions which have been modified on the virtual disk file are ascertained.

---

420
The regions in common are added to regions associated with metadata that has changed.

| |
|---|
| 810<br>An information collection module. |
| 820<br>A selective replication region identification module. |
| 830<br>A replication module. |

FIG 8

SELECTIVE VIRTUAL MACHINE IMAGE REPLICATION SYSTEMS AND METHODS

FIELD OF THE INVENTION

The present embodiments relate to the field of information storage and virtual machine file replication.

BACKGROUND OF THE INVENTION

Electronic systems and circuits are often utilized in a number of applications to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of important and confidential information and significant resources are expended storing and processing the information. Maintaining and tracking the information, including replication and backup information, is often very important for a variety of reasons (e.g., recovery, corruption, correction, etc.).

Some traditional processing and storage approaches utilize virtual machines. A virtual machine typically involves "virtualization" or layers of abstraction in which various different hardware components are utilized to perform operations, wherein interactions at the virtual machine or higher level appear as interactions with a single machine or system. Virtual machines usually have a number of advantageous characteristics. For example, virtual machines usually facilitate instruction set architecture (ISA) independence from underlying hardware, relatively isolated coexistence of multiple operating system (OS) environments on the same system, and various application attributes (e.g., application provisioning, maintenance, recovery, etc.). However, traditional attempts at conventional virtual machine image backup replication often "consume" or "occupy" significant amounts of communication bandwidth and storage resources. The consumption or occupation of significant amounts of communication bandwidth and storage resources can have detrimental impacts on performance.

SUMMARY

Systems and methods for fault handling are presented. In one embodiment, a fault handling method includes: performing an information collection process, wherein the information collection process includes collecting information regarding guest operating system files of a virtual machine; performing a selective replication region identification process, wherein the selective replication region identification process includes identifying regions associated with a selective amount of the guest operating system files; and performing a replication process based upon results of the replication region identification process. In one embodiment, the selective replication region identification process includes identifying regions associated with files of interest. The selective replication region identification process can include identifying regions associated with temporary files. The information regarding files can include a list of regions used by the files after loopback mounting of a virtual disk file, a list of regions which have been modified on the virtual disk file, and regions associated with metadata that has changed. In one exemplary implementation, a selective replication region identification process comprises: ascertaining regions common to both the list of regions used by the files after loopback mounting of a virtual disk file and a list of regions which have been modified on the virtual disk file; and adding the regions in common and the regions associated with metadata that has changed. Performing a selective replication region identification process can include removing from selection regions associated with superfluous files. A selective replication region identification process can include identifying regions associated with non-superfluous information for replication.

In one embodiment, a computer readable storage medium having stored thereon, computer executable instructions that, when executed by a computer system cause the computer system to perform a method. In one embodiment, the method includes: performing an information collection process, wherein the information collection process includes collecting information regarding guest operating system files of a virtual machine; performing a selective replication region identification process, wherein the selective replication region identification process includes identifying regions associated with a selective amount of the guest operating system files; and performing a replication process based upon results of the replication region identification process. In one embodiment, the selective replication region identification process includes identifying regions associated with files of interest. The selective replication region identification process can include identifying regions associated with temporary files. The information regarding files can include a list of regions used by the files after loopback mounting of a virtual disk file, a list of regions which have been modified on the virtual disk file, and regions associated with metadata that has changed.

In one exemplary implementation, a computer system has a processor coupled to a computer readable storage media and the computer system executes computer readable code which causes the computer system to perform operations including: performing an information collection process, wherein the information collection process includes collecting information regarding guest operating system files of a virtual machine; performing a selective replication region identification process, wherein the selective replication region identification process includes identifying regions associated with a selective amount of the guest operating system files; and performing a replication process based upon results of the replication region identification process. In one embodiment, the selective replication region identification process includes identifying regions associated with files of interest. The selective replication region identification process can include identifying regions associated with temporary files. The information regarding files can include a list of regions used by the files after loopback mounting of a virtual disk file, a list of regions which have been modified on the virtual disk file, and regions associated with metadata that has changed.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 2 is a block diagram of an exemplary virtual machine switch over method in accordance with one embodiment of the present invention.

FIG. 3 is a block diagram of exemplary selective file replication method in accordance with one embodiment of the present invention.

FIG. 4 is a block diagram of an exemplary selective replication region identification process in accordance with one embodiment of the present invention.

FIG. 8 is a block diagram of an exemplary selective file replication module which includes instructions for directing a processor in performance of a storage method in accordance with one embodiment of the present invention.

DETAILED DESCRIPTION

Figure 1:
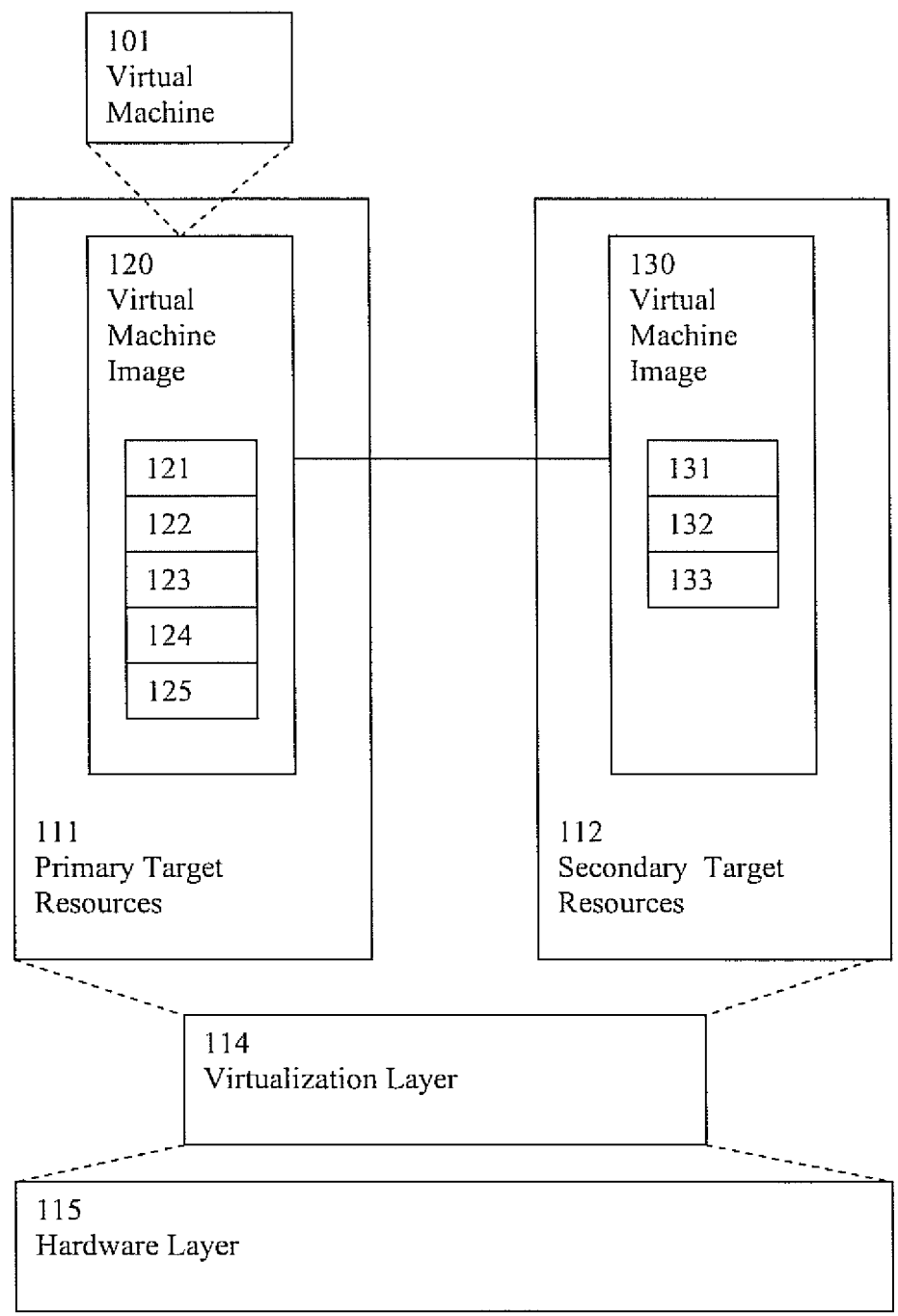
FIG. 1 is a block diagram of an exemplary virtual machine environment in accordance with one embodiment of the present invention.

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, it will be obvious to one ordinarily skilled in the art that the present invention may be practiced without these specific details. In other instances, well known methods, procedures, components, and circuits have not been described in detail as not to unnecessarily obscure aspects of the current invention.

The present systems and methods include approaches that facilitate efficient and effective replication or copying of selective portions of a virtual machine image. The systems and methods can facilitate robust maintenance of non-superfluous replication information (e.g., essential information, information a user has an interest in, etc.) with reduced replication of selected superfluous information. In one embodiment, selected superfluous information (e.g., unnecessary information, information a user is not interested in, information pertinent only to a first instance of a virtual machine, information in some temporary files, etc.) is not copied or written to storage regions associated with a secondary image of the virtual machine. In one exemplary implementation, a resulting secondary or replicated virtual machine image is smaller than (e.g., a subset of, etc.) a primary virtual machine image. The smaller secondary or replicated virtual machine image occupies less storage resources and communication bandwidth. Additional description of intelligent selective replication of virtual machine images is set forth in following sections.

In one embodiment, a virtual machine image includes information associated with a corresponding virtual machine (e.g., information utilized to create the virtual machine, information utilized to operate the virtual machine, guest operating system information, etc.). It is possible a first image of the virtual machine may include information superfluous to a second image of the virtual machine. For example, some of the information included in a first virtual machine image utilized in the creation, maintenance and operation of a first instance of the virtual machine is not required in the creation of the second instance of the virtual machine. For example, some virtual machines create temporary files that contain information that is only pertinent to a first instance of the virtual machine and the first instance version of the information is not necessary in the second instance of the virtual machine. In addition, a user may not be interested in maintaining some of the information from a first image of a virtual machine in a second image of the virtual machine. There are a variety of factors or parameters that can be utilized in determining which information is superfluous (e.g., system characteristics, business factors, etc.).

Present intelligent selective virtual machine image replication methods and systems are more efficient than conventional virtual machine image replication approaches with entire literal copies that consume or occupy more communication bandwidth and secondary storage resources (e.g., with unnecessary information, otherwise superfluous information, etc.). Traditional approaches typically include a lot of superfluous or "unwanted" data which is replicated, resulting in increase storage and bandwidth usage (e.g., by associated network traffic). The "unwanted" data can be based on the fact that entire VM images may not need to be replicated in order to re-create and subsequently operate a virtual machine. Present intelligent selective virtual machine image replication methods and systems are also often faster than conventional entire virtual machine image replication, as time impacts associated with intelligent selection operations are less than the adverse time impacts associated with communicating and processing entire content of a virtual machine image from primary storage resources to secondary storage resources.

FIG. 1 is a block diagram of exemplary virtual machine environment 100 in accordance with one embodiment of the present invention. Virtual machine environment 100 includes virtual machine 101, primary target resources 111, secondary target resources 112, virtualization layer 114 and hardware layer 115. The virtual machine 101 is run on components in hardware layer 115 via the virtualization layer 114. Virtual machine 101 is created and operated in accordance with information in virtual machine image 120 and can be recreated (e.g., as part of a fail over, disaster recovery, etc.) in accordance with information in virtual machine image 130. Virtual machine image 120 is stored on primary target resources 111 and virtual machine image 130 is stored on secondary target resources 112. Primary target resources 111 and secondary target resources 112 are communicatively coupled to one another and can include a variety of resource configurations. It is appreciated that primary target resources 111 and secondary target resources 112 can include virtual disks.

The components of virtual machine environment 100 cooperatively operate to facilitate virtual machine operations and intelligent selective data replication. Virtual machine image 120 is utilized in creation and operation of virtual machine 101. Virtual machine image 130 can be utilized to facilitate re-creation and sub-sequent operation of virtual machine 101 (e.g., as part of a fail over operation, disaster recovery operations, etc.). In one embodiment, content of virtual machine image 130 is similar to content of virtual machine image 120, except information that is superfluous to recreating virtual machine 101 (e.g., temporary files, files that are not interest to a user, etc.) is not included in virtual machine image 130. For example, data files 121 through 125 of virtual machine image 120 are utilized in the implementation and operation of virtual machine 101. In one exemplary implementation, data files 131 through 133 of virtual image 130 are an intelligent selective subset of data files data files 121 through 125. In one exemplary implementation, the data files 131 through 132 are intelligently selected based upon containing content sufficient to implement virtual machine 101.

In one embodiment, the contents of data files 131, 132 and 133 are similar to data files 121, 122 and 123 respectively. In one exemplary implementation, the contents of files 121, 122 and 123 include information that is non-superfluous to the re-creation and operation of virtual machine 101 and are selected for copying to files 131, 132 and 133 while the contents of file 124 includes superfluous information to the re-creation and operation of virtual machine 101 and is not selected for copying to files stored on secondary target resources 112. File 125 includes information that a user is not interested in with respect to a re-created instance of virtual machine 101 and is not selected for copying to files stored on secondary target resources 112. Additional description of various exemplary intelligent selective replication operations and approaches are set forth in following sections of the detailed description.

FIG. 2 is a block diagram of exemplary virtual machine re-creation method 200 in accordance with one embodiment of the present invention. In one embodiment, re-creation method 200 utilizes secondary image content that is a smaller sub-set of primary image content to re-create and subsequently operate a virtual machine.

In block 210, virtual machine environment operations are engaged. In one embodiment, the virtual machine environment operations include operations for establishing the virtual machine. The virtual machine environment operations can also include operations associated with an application running on the virtual machine.

In block 220, an intelligent selective file replication process is performed. In one embodiment, files are intelligently selected for replication wherein the resulting secondary image is smaller than a primary image. In one exemplary implementation, files superfluous to the re-creation and subsequent operation of a virtual machine are not selected for replication in the secondary image. Additional description of intelligent selective file replication processes is set forth in following sections.

In block 230, a virtual machine re-creation process is performed. In one embodiment, the virtual machine re-creation process includes detecting a crash on a first instance of a virtual machine and determining if the virtual machine can be recreated using a first or primary virtual machine image. If the first or primary virtual machine image is not available for correctly re-creating the virtual machine, the process proceeds to re-create (e.g., load, reboot, etc.) and subsequently operate the virtual machine using a secondary virtual machine image. It is appreciated that the secondary virtual machine image can be considered a "new" primary virtual machine image once it begins to be utilized to re-create and subsequently operate the virtual machine. Furthermore, additional information (e.g., new temporary files, etc.) can be added to the "new" primary virtual machine image once it re-created begins to be utilized.

FIG. 3 is a block diagram of selective file replication method 300 in accordance with one embodiment of the present invention. In one embodiment, selective file replication method 300 is similar to a selective file replication method of block 220. Selective file replication method 300 can intelligently select virtual machine image files for replication without superfluous file content and file content a user is not interested in replicating. In one exemplary implementation of selective file replication method 300 in a virtualized environment, a virtual machine image is stored on virtual disk files and changes that happen in the guest OS go to the virtual disk files and are selectively replicated on other virtual disks.

In block 310, an information collection process is performed. In one embodiment, the information collection process includes collecting information regarding guest operating system files of a virtual machine. In one embodiment, the information regarding files includes a list of regions used by the files after loopback mounting of a virtual disk file, a list of regions which have been modified on the virtual disk file, and regions associated with metadata that has changed. In one exemplary implementation, the list of regions which have been modified on the virtual disk file include files included in a file change log and a file block map.

In block 320, a selective replication region identification process is performed. In one embodiment, the selective replication region identification process includes identifying regions associated with a selective amount of the guest operating system files. The selective replication region identification process can include identifying regions associated with files of interest and files a user is not interested in replicating. The selective replication region identification process can also include identifying regions associated with a variety of files (e.g., temporary files, a page file inside a guest OS, etc.). It is appreciated that regions associated with files that are to be replicated can be identified and regions associated with files that are not to be replicated can be identified. For example, the selective replication region identification process can identify or select non-superfluous files for replication and can include removing from selection regions associated with superfluous files. In one embodiment, a list of files (e.g., files to be replicated, files not to be replicated, etc.) is prepared within the guest OS and that list is passed to a file store replication service. In one embodiment, a namespace for a file is selected for preservation in a secondary virtual machine image but not the contents of the file from the primary virtual machine.

In block 330, a replication process is performed based upon the selective regions identified in block 320. For example, the replication process includes replicating data stored in the selective regions identified in block 320. In one embodiment, replication services are utilized. In one exemplary implementation, file level incremental replication is utilized. A namespace for a file can be preserved in a secondary virtual machine image without the contents of the file from the primary virtual machine.

FIG. 4 is a block diagram of an exemplary selective replication region identification process 400 in accordance with one embodiment of the present invention. In one embodiment, exemplary selective replication region identification process 400 is similar to an exemplary selective replication region identification process of block 320. In block 410, regions in common to both a list of regions used by the files after loopback mounting of a virtual disk file and a list of regions which have been modified on the virtual disk file are ascertained. In block 420, the regions in common are added to regions associated with metadata that has changed.

Figure 5:
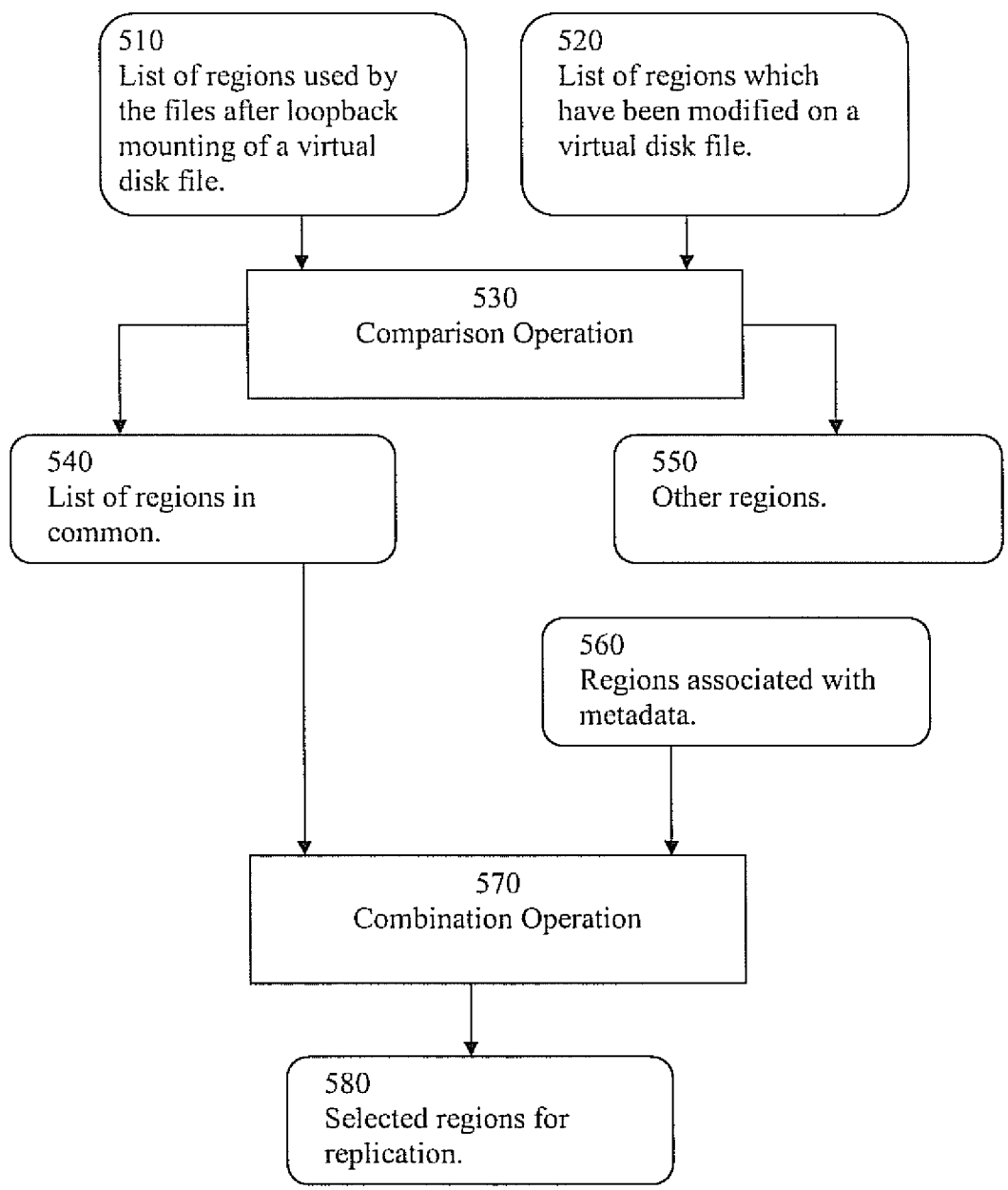
FIG. 5 is a block diagram of an exemplary selective replication data flow in accordance with one embodiment of the present invention.

FIG. 5 is a block diagram of exemplary selective replication data flow in accordance with one embodiment of the present invention. Block 510 is a list of regions used by the files after loopback mounting of a virtual disk file. The list of block 510 is feed into comparison operation block 530. Block 520 is a list of regions which have been modified on a virtual disk file. The list of block 520 is also feed into comparison operation block 530. Comparison operation block 530 performs a comparison of the list of regions in block 510 and the list of regions in block 520. In one embodiment, a comparison component is utilized to perform comparison block 530. Comparison operations produce results in blocks 540 and 550. Block 540 includes a list of regions in common between the list of regions used by the files after loopback mounting of a virtual disk file and the list of regions which have been modified on a virtual disk file. Block 550 includes a list of other regions. For example, the other regions can include regions that are not in common between the list of regions used by the files after loopback mounting of a virtual disk file and the list of regions which have been modified on a virtual disk file.

In the present example, the other regions of block 550 are not forwarded for inclusion in selected replication regions (e.g., in block 580). It is appreciated that selective file replication methods and system can be adapted to handle additional parameters for inclusion in a selective replication identification process. In one exemplary implementation, the selective replication identification process includes selection parameters or metrics associated with a type of file (e.g., temporary file, etc.), selection parameters or metrics associated (e.g., files of interest, a subset of guest OS files, etc.).

Figure 6:
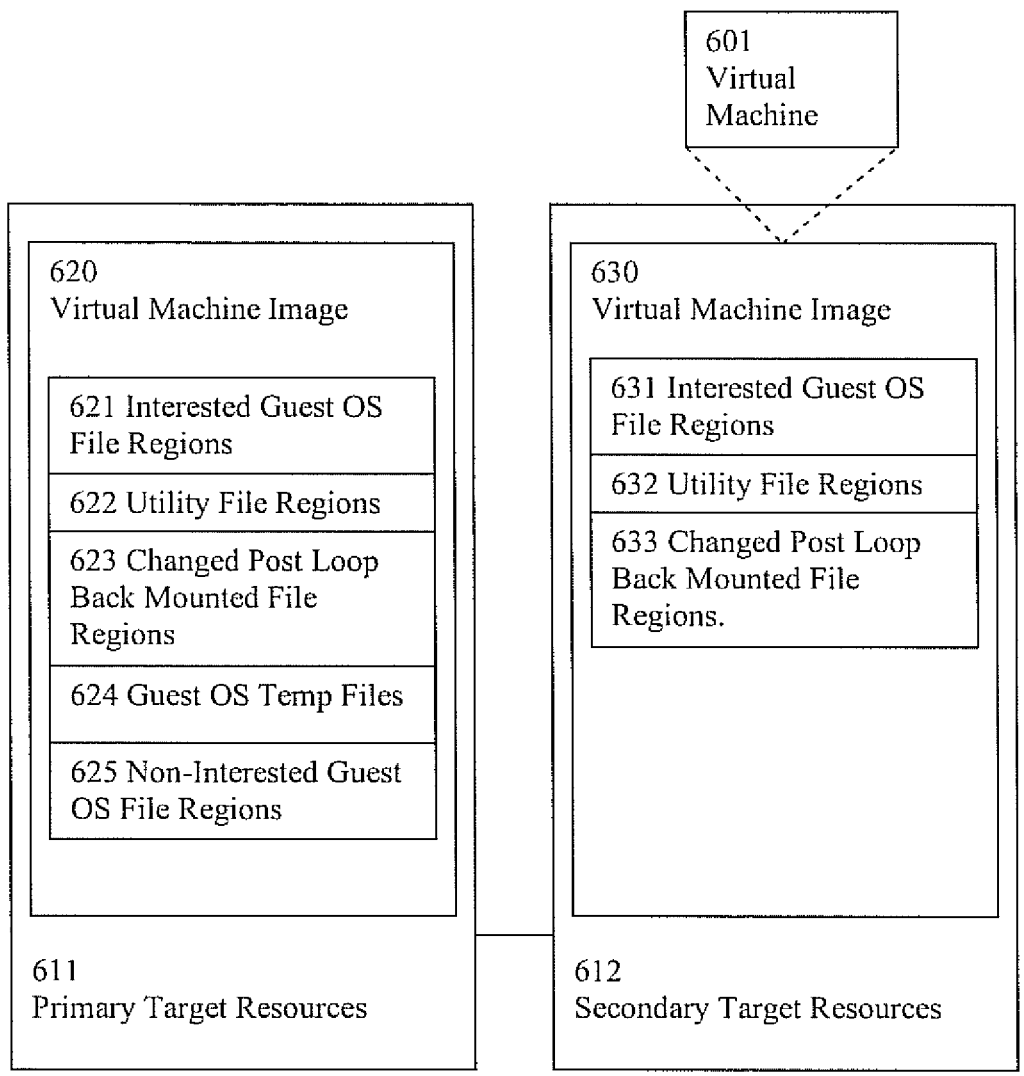
FIG. 6 is a block diagram of another exemplary virtual machine environment in accordance with one embodiment of the present invention.

FIG. 6 is a block diagram of exemplary virtual machine environment 600 in accordance with one embodiment of the present invention. In one embodiment, virtual machine environment 600 is similar to virtual machine environment 100. Virtual machine environment 600 includes virtual machine image 620 stored on primary target resources 611 and virtual machine image 630 stored on secondary target resources 612. The components of virtual machine environment 600 cooperatively operate in virtual machine operations. FIG. 6 illustrates the implementation of a virtual machine 610 after a switch over (e.g., fail over, etc.) to virtual machine image 630. Files 631, 632 and 633 are utilized to recreate the virtual machine 601. As indicted in the figure, file regions 621 are associated with portions of a guest OS contents a user is interested in and are copied to file regions 631, files regions 622 are associated with requisite utility contents and are copied to file regions copied to file regions 632, and file regions 623 are associated with changed post loop back mounted information and are copied to file regions 633. File regions 624 associated with guest OS temp files is not copied to virtual machine image 630. File regions 625 associated with portions of guest OS content a user is not interested in are not copied to virtual machine image 630.

In one embodiment of present systems and methods, a virtual machine is mounted on a virtual disk and regions of the virtual disk are selected for replication. A file server can be utilized in the implementation of the virtual disk. Mapping of virtual machine input/outputs (I/O) can be performed within a file server. The file server can be network file server or a local files server. In one exemplary implementation, no extra software is required on the file server and a virtual machine and guest OS are not "touched" or interfered with by the selective file replication method or process.

Figure 7:
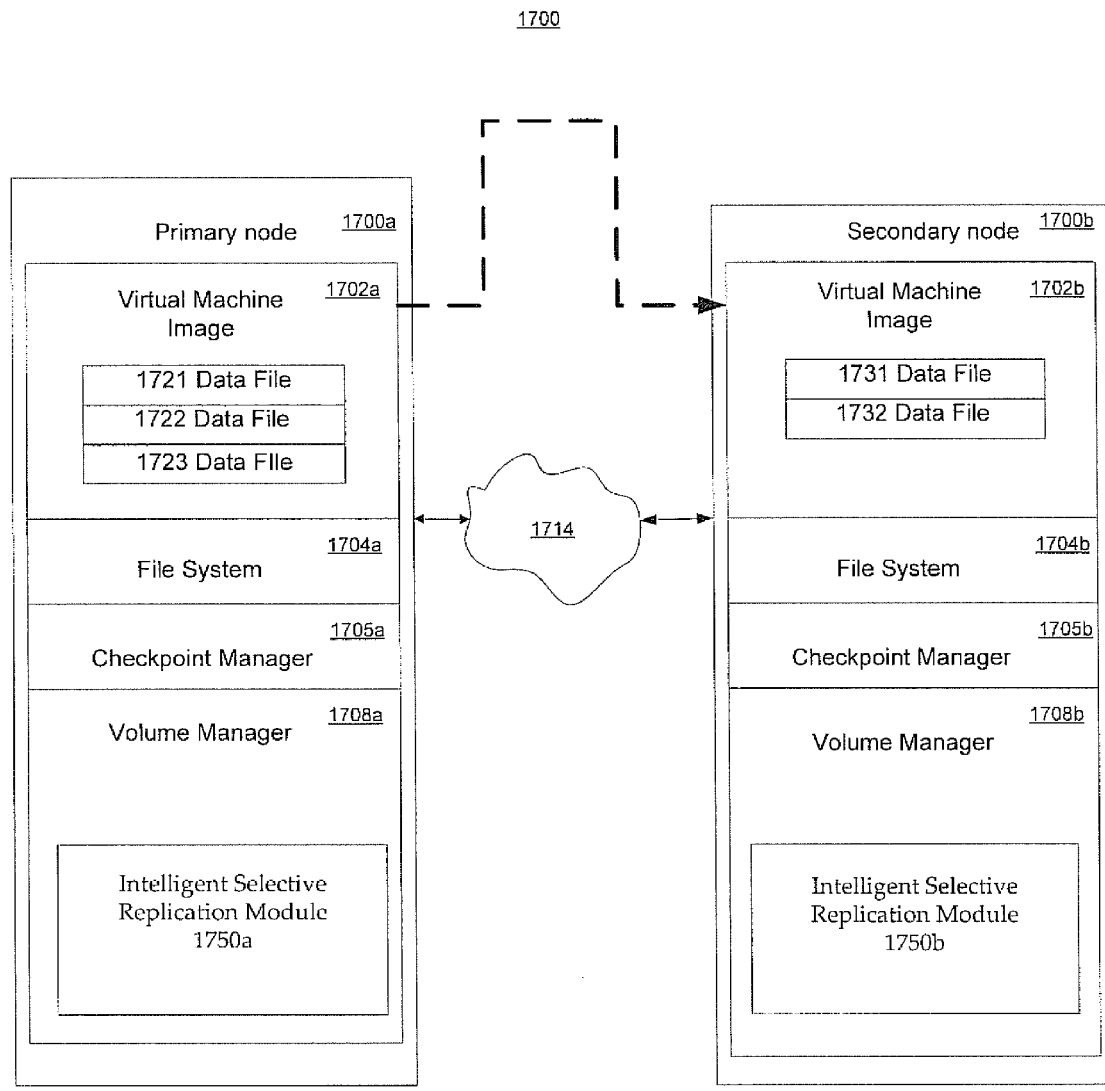
FIG. 7 illustrates a periodic replication operation within an exemplary replication system environment according to an embodiment of the present invention.

In one embodiment, there is a replication service configured as an appliance replicating files to a data recovery storage appliance using file system checkpoints. FIG. 7 illustrates a periodic selective replication operation within a replication system environment 1700 according to an embodiment of the present invention. During synchronization, relevant selective contents (e.g., selective information in use, selective incrementally modified or changed information, etc.) of primary virtual machine image 1702a are transferred or copied to a replicated secondary virtual machine image 1702b. For example, data file 1721 and 1722 contents are copied to data files 173 and 1732 respectively while content from data file 1723 is not copied. In one embodiment, due to intelligent selection the data in secondary virtual machine image 1702b is a subset of the data in primary virtual machine image 1702a. In one embodiment, to maintain the accessibility of the primary data volume, a point-in-time "snapshot" volume (S_Vol) is created and the periodic replication is performed using the snapshot volume. Similarly, to maintain the accessibility of the secondary data volume, a point-in-time "snapshot" volume (S_Vol) is created and used at the secondary system 1700b to receive selective incremental changes from the primary system 1700a and to restore the replicated secondary data volume.

Primary system 1700a and secondary system 1700b of the illustrated embodiment each respectively include a virtual machine image 1702a and 1702b, a file system 1704a and 1704b, a checkpoint manager 1705a and 1705b and a volume manager 1708a and 1708b. These can be implemented in respective processors and memory of systems associated with primary node 1700a and secondary node 1700b. Primary node 1700a is coupled to a secondary system 1700b via a network 1714 (e.g., an IP network, LAN, WAN, etc.). The components of replication system environment 1700 cooperatively operate to provide a secondary virtual machine image 1702a via the use of an intelligent selective synchronization. In one embodiment, the functionality for managing the creation of checkpoints is implemented by the checkpoint managers 1705a and 1705b. In one embodiment, checkpoint managers 1705a and 1705b utilize a point-in-time "snapshot" volume (S_Vol) to create a "checkpoint" in time and the selective synchronization (as well as subsequent periodic selective replication) is performed using the snapshot volume. As the selective synchronization is being performed, updates (e.g., write operations or other changes) to the primary data volume are tracked for later use in performing periodic selective replication. In one embodiment, volume replicators 1708a and 1708b manage selective volume data replication and include respective intelligent synchronization modules 1751a and 1751b for performing efficient intelligent replication updates.

In one embodiment, the new approach integrates capabilities of a storage replication solution with additional modules to achieve the intelligent selective replication. FIG. 8 is a block diagram of selective file replication module 800 which includes instructions for directing a processor in performance of a file replication method (e.g., file replication method 300, etc.). File replication module 800 includes information collection module 810, selective replication region identification module 820, and reporting module 830. Information collection module 810 includes instructions for performing information collection. In one embodiment, information collection module 810 includes instructions for performing information collection as indicated in block 310. Selective replication region identification module 820 includes instructions for performing selective replication region identification. In one embodiment, selective replication region identification module 820 includes instructions for performing selective replication region identification in block 320. Replication module 830 includes instructions for information replication. In one embodiment, replication module 830 includes instructions for replicating information as indicated in block 330.

Figure 9:
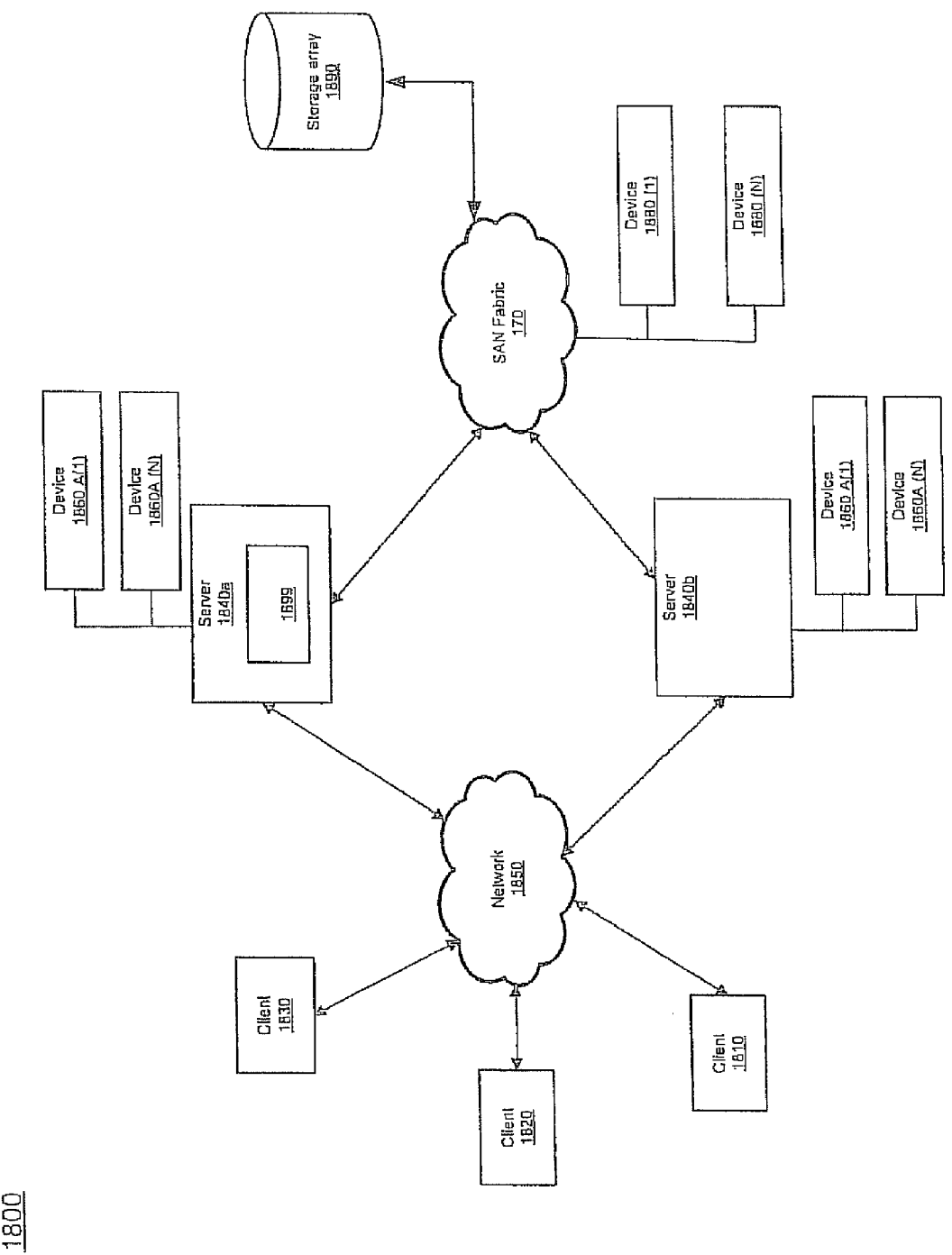
FIG. 9 is a block diagram of an exemplary network architecture in accordance with one embodiment of the present invention.

It is appreciated present intelligent selective replication systems and methods can be implemented as part of a variety of environments. For example, intelligent selective replication systems and methods can be implemented as part of a distributed computing environment, a cloud computing environment, a client server environment, etc. In one embodiment, a selective file replication method (e.g., selective file replication method 300, etc.) can be implemented on a network. FIG. 9 is a block diagram depicting a network architecture 1800 in which client systems 1810, 1820 and 1830, as well as storage servers 1840A and 1840B (any of which can be implemented using computer system 1110), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and so by client systems 1810, 1820 and 1830 via network 1850. Intelligent storage array 1890 is also shown as an example of a specific storage device accessible via SAN fabric 1870. In one embodiment, server 1840A includes selective file replication module 1899. In one embodiment, selective file replication module 1899 is similar to selective file replication module 800. It is appreciated that present systems and methods are compatible with a variety of implementations. For example, portions of information and instructions associated with can be distributed in various resources.

Figure 10:
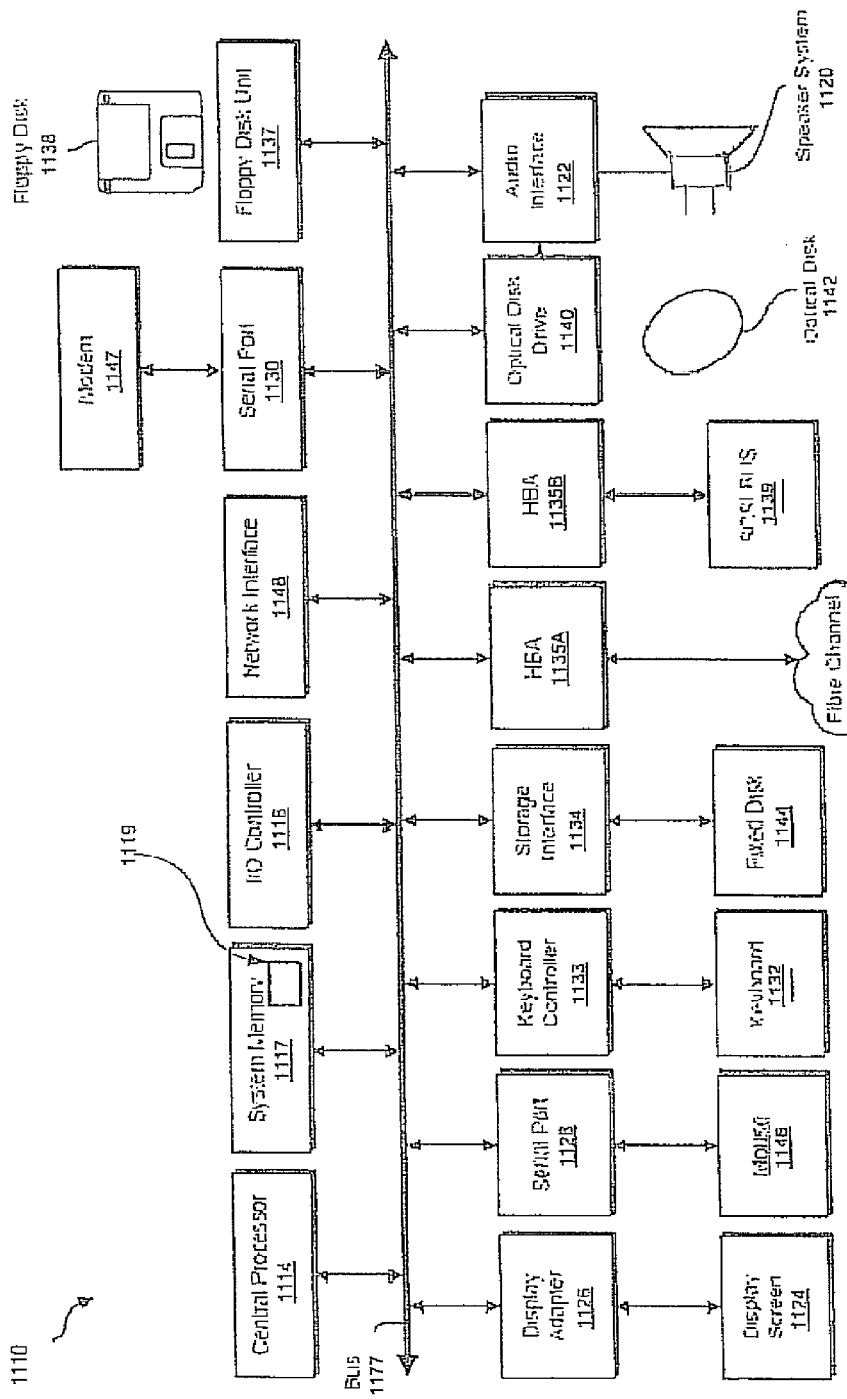
FIG. 10 depicts a block diagram of an exemplary computer system suitable for implementing the present methods in accordance with one embodiment of the present invention.

FIG. 10 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1112 via serial port 1128), a modem 1147 (coupled to bus 1112 via serial port 1130), and a network interface 1148 (coupled directly to bus 1112).

Bus 1177 allows data communication between central processor 1114 and system memory 1117, which may include read-only memory (ROM) or flash memory (neither shown), and random access memory (RAM) (not shown), as previously noted. In one embodiment, instructions for performing a selective file replication method (e.g., similar to selective file replication method 200, etc.) are stored in one or more memories of computer system 1100 (e.g., in memory location 1119). The RAM is generally the main memory into which the operating system and application programs are loaded. In one embodiment, RAM 1117 includes a selective file replication module (e.g., in memory location 1119). In one embodiment, a selective file replication module stored in memory location 1119 is similar to selective file replication module 1300. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 248.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on storage server 1840A or 1840B using, for example, a web browser or other client software (not shown). Such a client allows client systems 1810, 1820 and 1830 to access data hosted by storage server 1840A or 1840B or one of storage devices 1860A(1)-(N), 1860B(1)-(N), 1880(1)-(N) or intelligent storage array 190. FIG. 10 depicts the use of a network such as the Internet for exchanging data, but the present disclosure is not limited to the Internet or any particular network-based environment.

Thus, present systems and methods facilitate efficient and effective replication or copying of selective portions of a virtual machine image. The systems and methods enable robust maintenance of non-superfluous replication information with reduced replication of selected superfluous information. The reduced secondary or replicated virtual machine image occupies less storage resources and communication bandwidth. Present intelligent selective virtual machine image replication methods and systems are more efficient than conventional literal entire virtual machine image replication approaches that consume or occupy more communication bandwidth and secondary storage resources (e.g., with unnecessary information, otherwise superfluous information, etc.). Selection of replication information can be flexibly and intelligently based on a variety of factors or parameters that can be utilized in determining which information is superfluous.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A selective file replication method, comprising:
performing, using at least one processor, an information collection process, wherein said information collection process includes collecting information regarding guest operating system files of a virtual machine, wherein said information regarding files includes a list of regions used by the files after loopback mounting of a virtual disk file, a list of regions which have been modified on said virtual disk file, and regions associated with metadata that has changed;
performing a selective replication region identification process, wherein said selective replication region identification process comprises:
identifying regions associated with a selective amount of said guest operating system files, and
ascertaining regions in common in said information regarding guest operating system files of a virtual machine; and
performing a replication process based upon results of said replication region identification process.

2. The selective file replication method of claim 1 wherein said selective replication region identification process includes identifying regions associated with files of interest.

3. The selective file replication method of claim 1 wherein said selective replication region identification process includes identifying regions associated with temporary files.

4. The selective file replication method of claim 1 wherein said selective replication region identification process comprises:

ascertaining regions in common to both said list of regions used by the files after loopback mounting of a virtual disk file and a list of regions which have been modified on said virtual disk file; and adding said regions in common and said regions associated with metadata that has changed.

5. The selective file replication method of claim 1 wherein said performing a selective replication region identification process includes removing from selection regions associated with superfluous files.

6. The selective file replication method of claim 1 wherein said selective replication region identification process includes identifying regions associated with non-superfluous information for replication.

7. A non-transitory computer readable storage medium having stored thereon, computer executable instructions that, when executed by a computer system cause the computer system to perform a method comprising:

performing an information collection process, wherein said information collection process includes collecting information regarding guest operating system files of a virtual machine, wherein said information regarding files includes a list of regions used by the files after loopback mounting of a virtual disk file, a list of regions which have been modified on said virtual disk file, and regions associated with metadata that has changed;

performing a selective replication region identification process, wherein said selective replication region identification process comprises:

identifying regions associated with a selective amount of said guest operating system files, and ascertaining regions in common in said information regarding guest operating system files of a virtual machine; and performing a replication process based upon results of said replication region identification process.

8. The computer readable storage medium of claim 7 wherein said selective replication region identification process includes identifying regions associated with files of interest.

9. The computer readable storage medium of claim 7 wherein said selective replication region identification process includes identifying regions associated with temporary files.

10. The computer readable storage medium of claim 7 wherein said selective replication region identification process comprises:

ascertaining regions in common to both said list of regions used by the files after loopback mounting of a virtual disk file and a list of regions which have been modified on said virtual disk file; and adding said regions in common and said regions associated with metadata that has changed.

11. The computer readable storage medium of claim 7 wherein said performing a selective replication region identification process includes removing from selection regions associated with superfluous files.

12. The computer readable storage medium of claim 7 wherein said selective replication region identification process includes identifying regions associated with non-superfluous information for replication.

13. A computer system, comprising:

a computer system having a processor coupled to a computer readable storage media and executing computer readable code which causes the computer system to perform operations including:

performing an information collection process, wherein said information collection process includes collecting information regarding guest operating system files of a virtual machine, wherein said information regarding files includes a list of regions used by the files after loopback mounting of a virtual disk file, a list of regions which have been modified on said virtual disk file, and regions associated with metadata that has changed;

performing a selective replication region identification process, wherein said selective replication region identification process comprises:

identifying regions associated with a selective amount of said guest operating system files, and ascertaining regions in common in said information regarding guest operating system files of a virtual machine; and performing a replication process based upon results of said replication region identification process.

14. The computer system of claim 13 wherein said selective replication region identification process includes identifying regions associated with files of interest.

15. The computer system of claim 13 wherein said selective replication region identification process includes identifying regions associated with temporary files.

16. The computer system of claim 13 wherein said selective replication region identification process comprises:

ascertaining regions in common to both said list of regions used by the files after loopback mounting of a virtual disk file and a list of regions which have been modified on said virtual disk file; and adding said regions in common and said regions associated with metadata that has changed.

17. The computer system of claim 13 wherein said performing a selective replication region identification process includes removing from selection regions associated with superfluous files.

* * * * *